Patented Dec. 5, 1939

2,182,384

UNITED STATES PATENT OFFICE 2,182,384

RECOVERY OF WASTES FROM GLASS GRINDING AND POLISHING OPERATIONS

Rob Roy McGregor, Swissvale, Pa., assignor to Norbert S. Garbisch, Butler, Pa.

No Drawing. Application April 13, 1937, Serial No. 136,699

3 Claims. (Cl. 252—8)

The present invention relates to the treatment of siliceous materials and it has particular relation to the treatment of waste sand obtained in the grinding and polishing of plate glass.

One object of the invention is to convert the heretofore substantially valueless, finely pulverized sand resulting from the grinding and polishing of glass into material highly valuable for many purposes, including use as a source of sand and cullet in the compounding of glass; as a substitute for ground flint and quartz in the making of pottery; in a slip in the glazing of vitreous ware; as a source of silica in the manufacture of Portland cement; as a raw material for use in the manufacture of water glass; as cleaning and polishing materials; as fillers and pigments for use in the compounding of rubber, artificial resins, paints, and varnishes; as a wash for cores and molds employed in foundries; as a material for the manufacture of inert carriers for catalysts employed in chemical operations; as an inert material in the manufacture of sanitary articles; and for many other purposes of highly diverse nature.

A second object of the invention is to provide a process of removing glass or the non-siliceous components of the glass from waste grinding sand in which the concentration of alkali employed to break down the glass is so proportioned as to obtain a high degree of selectivity, whereby the large proportion of the glass is dissolved or broken down, but action upon the silica is reduced to a minimum.

These and other objects will be apparent from consideration of the following specification and the accompanying claims.

In the manufacture of plate glass, the plates as initially obtained have relatively rough surfaces which for many purposes are objectionable. It is customary to subject such plates to a grinding or surfacing operation in order to remove the objectionable irregularities and to provide substantially smooth, plane surfaces.

This operation is conducted by cementing the plates with plaster of paris to moving tables or cars which are passed successively under a series of revolving cast iron blocks or runners while granular silica (i. e., sand) is fed under the runners as a water suspension or abrasive mixture to grind away the irregularities.

In the preparation of batch employed in the manufacture of glass, sand of great purity and containing only a fraction of a per cent of iron is commonly employed. Such sand is relatively expensive and for that reason is seldom used in the grinding operation, but instead is replaced by cheaper and relatively impure river sands which initially contain many impurities, such as iron compounds and the like often in intimate association with the silica.

The relatively coarse sand initially employed in roughing off the surface of the glass gradually becomes broken and worn down during the course of operations. At the same time, it becomes charged with fine flakes or chips of glass and iron which respectively are abraded from the surface of the glass and the iron grinding discs or runners. During operations, the sand is subjected from time to time to a classifying operation in any convenient form of apparatus in order to separate relatively fine particles from the coarser particles. The coarse material is then returned for use in making the coarser cuts upon the glass surface. The fine material is advanced to a later stage and used for smoothing up the partially ground surfaces. Ultimately the sand is ground to such fine state of sub-division and is so contaminated with iron and other impurities originally present in the sand, iron abraded from the runners, rouge, fine glass chips from the glass, gypsum from the polishing tables, oil from the machinery, dust from the factory, and other materials that it can no longer be used for grinding operations.

Typically, the discarded sand is of the following composition:

| | Percent |
|---|---|
| Sand grains | 70 –85 |
| Glass debris | 15 –25 |
| Gypsum | 0.3– 7 |
| Rouge | 0.2– 0.5 |
| Metallic iron | 1 – 2.5 |
| Organic matter, trace | |

This impure material has heretofore been finally discarded as useless waste, either by dumping it into a stream or by piling it upon any available land adjacent the factory. Either mode of disposal is highly objectionable. In case the material is allowed to run to waste in a stream or other body of water, contamination, of course, results. This in many cases is prohibited by law. The volume of sand employed in grinding plate glass is very great and it usually exceeds the amount of sand employed in the compounding of the glass. Accordingly, it is evident that an immense volume of waste is produced and if it is simply piled up, in course of time, much space is required for its storage.

The present invention is based upon the discovery that sand from glass grinding operations may by suitable treatment be purified of most of the objectionable impurities to produce a finely ground silica of great value for many purposes.

If sand of high purity, e. g., melting sand, is used for grinding operations, iron, the major portion of which is metallic iron abraded from the runners, is the most objectionable material and is usually present in amounts of about 1 to 2.5% based upon solids content. Various methods may be employed in the removal of metallic iron from waste sand. One convenient method involves subjecting the wastes from the polishing operations to the action of a magnetic separator. By this method, most of the free iron resulting from abrasion of the grinding discs is removed. In the event magnetic separation is employed, the operation should succeed the conclusion of the grinding operations as promptly as possible in order to obviate excessive oxidation of the finely ground iron. The residual non-magnetic oxides or other compounds of iron may be removed by digestion of the slurry or sludge of finely divided sand with an acid, such as hydrochloric acid, sulphuric acid, tartaric acid, nitric acid, or the like following by washing to remove the resultant soluble iron compounds.

A third method of removing particles of iron and iron oxide involves froth flotation. In this operation, a selective promoter of flotation which will increase the flotability of the particles of iron is employed. If desired, the iron may be given preliminary treatment in order to increase its flotability. Such treatment includes conventional sulfidation. It also includes treatment of the slurry of impure sand with copper sulphate presumably in order to deposit thin films of copper upon the surfaces of the particles of iron. The copper coated particles may then be floated without difficulty in the same manner as copper. The copper coated particles may also be given sulfide treatment with a soluble sulfide, such as sodium sulfide, hydrogen sulfide or the like. The flotation is then effected by methods similar to those employed in the concentration of low grade ores of metal, for example, a frothing agent, such as pine oil or the like, together with a flotation promoter, such as a xanthate, mercaptobenzothiazol, or the like are added and the slurry is then blown with air to form a froth which carries most of the iron.

The removal of the iron by chlorination is also contemplated as being within the purview of the invention. In such method, the waste sand is preliminarily freed of water by conventional methods and then exposed to the action of chlorine gas at a fairly high temperature; e. g., 1400 to 1800 deg. F. Chlorination of the iron to form iron chloride results and the latter at the temperature of operation is volatilized and leaves the silica and other relatively inert materials in substantially iron-free state. Two or more of these methods may be combined. For example, the major portion of the metallic iron may be removed magnetically, or by froth flotation and any residue of iron or iron compounds then removed by digestion with acid.

The operations involved in the acid purification of a waste grinding sand may be summarized as follows:

1. Collect the slurry from grinding operations in large tank or other suitable container.

2. Allow the slurry to settle and decant the clear liquid. The water content is thus reduced from 90 per cent to 50 per cent.

3. Agitate the thickened slurry in the same tank or in a smaller tank as may be convenient with an acid (i. e., hydrochloric or sulfuric). Enough acid is usually added to give an acid concentration of about 5 per cent.

4. Wash sand preferably by decantation.

5. Separate sand from water; e. g., by filtration.

6. Dry finely divided product.

For purposes of improving the color of the dry sand, it may be calcined at suitable temperatures; e. g., 1400 deg. to 1800 deg. F. Such calcination removes organic and volatile impurities. If it is conducted at a suitable temperature, it will also tend to sinter the glass particles and to bind the particles of silica into porous, but coherent masses, which in the form of briquettes or lumps are especially suitable for use in the formation of glass batches. These coherent masses when in the form of bricks or blocks are also of value as building blocks. Lumps and pellets may also be used as inert carriers for catalytically active substances, such as vanadium oxides, etc.

The sand resulting from the removal of the iron still contains the finely ground glass cullet. This cullet is desirable for many purposes. For example, in the manufacture of glass, it is necessary to add a large percentage of cullet to the batch for purposes of reducing the melting point of the batch and for purposes of otherwise promoting the operation of the glass furnace. The cullet commonly constitutes about 25 per cent of the batch and is usually in the form of crushed fragments of glass resulting from the various operations. It is found that grinding sand, after removal of the iron, contains the cullet already ground to an extremely fine state of subdivision and uniformly distributed in the sand. Crushing and mixing operations usually employed in preparing the silica and cullet for use are thus obviated.

The mixture of finely ground iron-free sand and glass cullet is also suitable for use in the manufacture of pottery as a substitute for ground flint which is usually required. The flint employed in the manufacture of pottery is customarily ground to a very fine powder that will pass a 300 mesh screen. Since the flint consists essentially of silica, it is apparent that the pulverized sand after removal of the iron is ideally suited for use as a substitute. The glass cullet contained therein acts as a flux in the pottery and may take the place of a part of the feldspar which is customarily employed as a flux in the manufacture of pottery. The mixture of silica and glass is also suitable for use in the preparation of glazes for pottery and enamel frits for cast iron and sheet steel porcelain enamels.

If removal of all or a part of gypsum and the glass constituents, such as calcium, silica and sodium is desired, the process should also include treatment of the waste sand with an alkali, such as sodium carbonate or sodium hydroxide; sodium silicate may, also, be employed. In such process, if the concentration of the alkali is properly regulated, the glass is preferentially attacked and is either dissolved or is so opened up that the sodium and calcium compounds may be washed out with water or with dilute acid. Any silica from the glass remaining apparently comprises porous frangible particles or skeletons. If the concentration of the alkali is maintained relatively low, e. g., about 5% of sodium hydroxide or 10% of sodium carbonate, the ground silica is not substantially attacked. It thus becomes possible to obtain a product consisting of practically pure silica in a very fine state of subdivision and of great value for commercial application. In such process, the metallic iron may if desired be removed as a preliminary step. This has been done with an electromagnet, or by dissolving it in acid, hydrochloric or nitric acids, for example, being satisfactory. The iron may also be removed by "flotation."

After removal of the major part of the metallic iron, it is preferable to reduce the amount of water in which the waste is suspended (from about 90 per cent) to about 50 per cent. This is not necessary, but is saving of chemicals in subsequent treatment.

The second major step consists in treating the waste with caustic alkali or of alkali carbonate. Caustic soda or sodium carbonate are satisfactory. This operation is conducted in a suitable vessel and may be effected at normal "room" temperatures, or the temperature may be elevated, depending upon conditions. At lower temperatures the reactions proceed more slowly but the advantage of more rapid action at higher temperatures is offset by the greater cost. Naturally, in co!? weather practical expediency will require heating. It is advisable also to provide means of stirring this reaction mixture, to insure contact between the alkali and each solid particle of the mass.

At temperatures attainable in open vessels concentrations of 5 per cent of caustic soda or 10 per cent of sodium carbonate are satisfactory. Higher concentrations may be used (e. g., 10 per cent caustic soda or 15 per cent sodium carbonate). However, as the concentration increases there is an increasing tendency to dissolve silica as well as glass. Substantial reduction of the concentration results in material slowing up of the reaction. At higher temperatures, such as may be attained by conducting the reaction in an autoclave, lower concentrations may be employed.

A variation of the alkali treatment involves simple digestion of the waste sand with water in an autoclave at a fairly high temperature, e. g., that corresponding to steam under 150 or 200 pounds pressure per square inch. As a result, a part of the alkali from the glass is hydrolized and then tends further to break down the latter. A small amount of additional alkali may also be incorporated if desired.

Several chemical reactions occur in this alkaline treatment. For example, if sodium carbonate is the alkali used, the gypsum ($CaSO_4.2H_2O$) is decomposed to form calcium carbonate ($CaCO_3$) and sodium sulphate ($Na_2SO_4$). (The sodium sulphate is soluble in water and is removed by the subsequent washing and the calcium carbonate is later dissolved in acid and likewise removed.)

The alkali also reacts chemically with the fine particles of glass in the waste. The chemical reactions involved appear to be complex but the major soluble product seems to be sodium silicate and it is evident that this is formed chiefly from the silica of the glass.

(This is also removed by washing and the glass residue, now consisting chiefly of calcium silicate or calcium carbonate, is in a form to be dissolved in the subsequent acid treatment.)

Rouge is an oxide of iron, and in its normal condition is slowly and incompletely soluble in acid. However, the alkaline treatment causes changes, little understood, which render it more rapidly and completely soluble in acid. Thus the alkaline treatment prepares the rouge contaminant for subsequent removal.

After this alkaline treatment, the material is filtered or allowed to settle and the solution decanted. The residue is washed with water to remove as much as is practicable of the soluble materials. The solution contains slight excess of the alkaline reagent, a considerable amount of sodium silicate and most or all of the sulphate (derived from the gypsum) in the form of sodium sulphate. This solution may be concentrated, and use made of the sodium silicate, which, for example is suitable for briquetting the glass batch, and other commercial applications.

The residue from this filtration consists of sand grains, iron oxide (derived partly from the rouge and partly from oxidation of the iron from the runner bar), calcium silicate residue from the glass debris, or at least a residue of modified glass composition, calcium carbonate (derived from the gypsum), minor quantities of gypsum and organic matter and perhaps other contaminants.

The next step in the process is the treatment of this residue with dilute acid. For this purpose nitric, tartaric, or hydrochloric acid is suitable. It has been found that a concentration of the order of 5 to 20 per cent is adequate. If complete removal of calcium is not required sulfuric acid may also be employed. This treatment may be carried out at room temperatures or at elevated temperatures, it being recognized that the reactions involved proceed more rapidly at the higher temperatures. This acid treatment is for the purpose of dissolving the residual impurities, as for example, the calcium carbonate is dissolved entirely, the glass residue is largely deprived of its calcium and sodium, and the iron oxides and any remaining traces of metallic iron are dissolved in large measure. The residue from this acid treatment thereby consists of grains of the original sand approximately of their original composition and of traces of organic materials.

The next step is filtration and washing whereby the acid and dissolved substances are removed. The residue after drying may if desired be heated in air to decompose and oxidize the small amounts of organic materials, so that the final product is a substantially white material. In this entire process, each step may be repeated several times if desired.

The following analyses furnish an example of the purification effected by this process.

*Composition*

| | Before treatment | After treatment |
|---|---|---|
| $SiO_2$ | 90.00 | 98.50 |
| $Al_2O_3$ | .50 | .14 |
| $Fe_2O_3$ | 1.00 | .03 |
| $CaO$ | 4.00 | .64 |
| $MgO$ | Trace | Trace |
| Alkalis | 4.00 | .67 |

The purity of the silica may be further increased by repetition of the treatment or by prolonging or by intensifying the digestion with alkali and/or acid. The process may be outlined as follows:

1. Collect sand in a large tank or other receptacle.
2. Allow solids to settle and decant the clear liquid.

3. Digest the slurry with soda ash or caustic soda at a suitable temperature and in appropriate amount.

4. The silica is then washed by suitable method with water to remove soluble materials, including excess alkali, sodium silicate, etc. The first extract is rich in sodium silicate and should be saved.

5. The residue is then treated with 5 per cent hydrochloric acid. As a result the iron and compounds of iron are dissolved. Calcium compounds from the glass debris are also dissolved.

6. The residue is then washed free of soluble material.

7. The solids are filtered.

8. The solids are dried.

9. The solids may be calcined at a suitable temperature, e. g., 850 deg. to 1800 deg. F.

The silica is snow white and so finely divided that nearly all of it (90 or 95%) will pass through a screen of 325 mesh. Without any additional grinding, it is ready for use as a source of silica in pottery; as a filler for paints and varnishes, paper, rubber, artificial resins, such as Bakelite; or for practically any other use calling for very pure and finely divided silica. Since the cost of conventional grinding of silica is very great, the saving effected in the herein described process is quite large.

The process herein disclosed is of particular value in the treatment of relatively fresh wastes derived by use of initially relatively pure silica (i. e., silica containing not more than 0.2 or 0.5 per cent of iron). However, wastes from relatively impure river sands may be treated to remove iron or iron and glass. Although it is difficult to obtain a product equal in purity to that derived from wastes resulting from use of pure silica, it is still of sufficient purity to admit of application for many purposes. The process is also applicable to purifying wastes which have been aged in dumps.

The embodiments of the invention herein disclosed are to be considered merely as exemplary. It will be apparent to those skilled in the art that numerous modifications may be made therein without departure from the spirit of the invention or the scope of the appended claims.

What I claim is:

1. A process of producing relatively pure substantial iron-free mixtures of intimately associated and very finely divided silica and glass suitable for use as a combined source of silica and cullet in a glass batch, as a substitute for both ground flint and felspar in a ceramic body and similar purposes, from waste sand produced in the grinding of the surface of glass plates with sand of glass batch purity, said waste sand containing substantial amounts of iron added by the grinding operations and being of a particle size such that at least about 90 per cent of it will pass through a screen of about 325 mesh, which process comprises treating the sand sludge while fresh from the grinding operation by means of a magnetic separator to take out metallic iron particles, then treating it with a solution consisting of a strong mineral acid and water, the acid being of a concentration of not substantially greater than 10 per cent and being in an amount sufficient to take out substantially all of the free iron and iron compounds remaining in the wastes, then washing out the dissolved iron and freeing the wastes of excess water.

2. A process as defined in claim 1 in which the mineral acid is sulphuric acid.

3. The intimately admixed and finely divided iron free mixture of silica and glass from waste sand from the grinding and polishing of glass obtained by the process defined in claim 1.

ROB ROY McGREGOR.